United States Patent
Ng et al.

(10) Patent No.: US 9,019,924 B2
(45) Date of Patent: Apr. 28, 2015

(54) HIGH-ORDER MULTIPLE-USER MULTIPLE-INPUT MULTIPLE-OUTPUT OPERATION FOR WIRELESS COMMUNICATION SYSTEMS

(71) Applicant: Samsung Electronics Co., Ltd, Suwon-si, Gyeonggi-do (KR)

(72) Inventors: Boon Loong Ng, Dallas, TX (US); Krishna Sayana, San Jose, CA (US); Jianzhong Zhang, Plano, TX (US); Young-Han Nam, Richardson, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 106 days.

(21) Appl. No.: 13/841,791

(22) Filed: Mar. 15, 2013

(65) Prior Publication Data

US 2013/0265951 A1    Oct. 10, 2013

Related U.S. Application Data

(60) Provisional application No. 61/620,318, filed on Apr. 4, 2012, provisional application No. 61/668,877, filed on Jul. 6, 2012.

(51) Int. Cl.
*H04W 4/00* (2009.01)
*H04W 72/04* (2009.01)
*H04L 5/00* (2006.01)
*H04B 7/04* (2006.01)
*H04W 72/12* (2009.01)

(52) U.S. Cl.
CPC .......... *H04W 72/042* (2013.01); *H04L 5/0092* (2013.01); *H04B 7/0452* (2013.01); *H04L 5/0007* (2013.01); *H04W 72/12* (2013.01)

(58) Field of Classification Search
USPC .......................................... 370/329, 341, 348
See application file for complete search history.

(56) References Cited

U.S. PATENT DOCUMENTS

| | | | |
|---|---|---|---|
| 8,532,051 B2 * | 9/2013 | Prasad et al. .................. | 370/330 |
| 8,537,862 B2 * | 9/2013 | Blankenship et al. ........ | 370/483 |
| 2005/0043031 A1 | 2/2005 | Cho et al. | |
| 2010/0074207 A1 | 3/2010 | Pan et al. | |
| 2011/0194593 A1 | 8/2011 | Geirhofer et al. | |

OTHER PUBLICATIONS

International Search Report dated Jul. 2, 2013 in connection with International Patent Application No. PCT/KR2013/002629, 3 pages.

(Continued)

*Primary Examiner* — Mohammad Anwar

(57) ABSTRACT

Methods and apparatuses schedule resources and identify resource scheduling in a MU MIMO wireless communication system. A method for identifying resource scheduling for a UE includes receiving downlink control information; identifying, from the downlink control information, one or more DM-RS ports assigned to the UE and a PDSCH EPRE to DM-RS EPRE ratio; and identifying data intended for the UE in a resource block in a downlink subframe using the one or more DM-RS ports and the PDSCH EPRE to DM-RS EPRE ratio. A method for scheduling resources includes identifying one or more DM-RS ports to assign to a UE and a PDSCH EPRE to DM-RS EPRE ratio for identifying data intended for the UE in a resource block in a downlink subframe; and including an indication of the one or more DM-RS ports and the PDSCH EPRE to DM-RS EPRE ratio in downlink control information.

20 Claims, 7 Drawing Sheets

(56) References Cited

OTHER PUBLICATIONS

Written Opinion of International Searching Authority dated Jul. 2, 2013 in connection with International Patent Application No. PCT/KR2013/002629, 5 pages.
European Search Report dated Jul. 22, 2013 in connection with European Patent Application 13162199.7; 7 pages.
3GPP TSG RAN WG1 Meeting #59; Further Discussion on Signaling of DM-RS Port for LTE-A MIMO Transmission Jeju, Korea; Nov. 9-13, 2009; Research in Motion; 6 pages.
3GPP TSG RAN WG1 Meeting #61bis; "DMRS Configuration for DL MU-MIMO in LTE-Advanced"; Dresden, Germany; Jun. 28-Jul. 2, 2010; NTT DOCOMO; 5 pages.
3GPP TSG-RAN WG1 Meeting #59; Downlink control signaling support for SU/MU-MIMO Jeju, Korea; Nov. 9-13, 2009; NEC Group; 7 pages.
3GPP TSG RAN WG1 #58bis; "Control Signaling for LTE Rel-9 Enhanced DL transmission" Miyazaki, Japan; Oct. 12-16, 2009; Motorola; 5 pages.
3GPP TSG RAN WG1 #61; "Discussion on transparency of LTE-A MU-MIMO"; Montreal, Canada; May 10-14, 2010; InterDigital Communications LLC; 6 pages.

* cited by examiner

HIGH-ORDER MULTIPLE-USER MULTIPLE-INPUT MULTIPLE-OUTPUT OPERATION FOR WIRELESS COMMUNICATION SYSTEMS

CROSS-REFERENCE TO RELATED APPLICATION(S) AND CLAIM OF PRIORITY

The present application claims priority to U.S. Provisional Patent Application Ser. No. 61/620,318, filed Apr. 4, 2012, entitled "METHODS AND APPARATUS FOR SUPPORTING HIGH-ORDER MU-MIMO OPERATION FOR WIRELESS COMMUNICATIONS SYSTEM" and U.S. Provisional Patent Application Ser. No. 61/668,877, filed Jul. 6, 2012, entitled "METHODS AND APPARATUS FOR SUPPORTING HIGH-ORDER MU-MIMO OPERATION FOR WIRELESS COMMUNICATIONS SYSTEM". The content of the above-identified patent documents is incorporated herein by reference.

TECHNICAL FIELD

The present application relates generally to multiple-user (MU) multiple-input multiple-output (MIMO) wireless communication systems and, more specifically, to techniques for enabling and supporting high order MU-MIMO operation for wireless communication systems.

BACKGROUND

In radio, MU-MIMO is a set of MIMO techniques that use multiple independent terminals (e.g., user equipments (UEs)) in order to enhance the communication capabilities of each UE. Standards limit the number of UEs that are supported by MU-MIMO. For example, in release 10 of the 3GPP LTE, only four MU-MIMO users may be supported.

Accordingly, there is a need for techniques for enabling and supporting high order MU-MIMO operation for wireless communication systems.

SUMMARY

Embodiments of the present disclosure provide methods and apparatuses to schedule resources and identify resource scheduling in a MU-MIMO wireless communication system.

In one embodiment, a method for identifying resource scheduling for a UE in a multiple-user multiple-input multiple-output wireless communication system is provided. The method includes receiving downlink control information. The method includes identifying, from the downlink control information, one or more DM-RS ports assigned to the UE and a PDSCH EPRE to DM-RS EPRE ratio. Additionally, the method includes identifying data intended for the UE in a resource block in a downlink subframe using the one or more DM-RS ports and the PDSCH EPRE to DM-RS EPRE ratio. The resource block in the downlink subframe includes data for multiple users in the wireless communication system.

In another embodiment, a method for scheduling resources in a multiple-user multiple-input multiple-output wireless communication system is provided. The method includes identifying one or more DM-RS ports to assign to a UE and a PDSCH EPRE to DM-RS EPRE ratio for identifying data intended for the UE in a resource block in a downlink subframe. Additionally, the method includes including an indication of the one or more DM-RS ports and the PDSCH EPRE to DM-RS EPRE ratio in downlink control information. The resource block in the downlink subframe includes data for multiple users in the wireless communication system.

In yet another embodiment, an apparatus configured to identify resource scheduling for a UE in a multiple-user multiple-input multiple-output wireless communication system is provided. The apparatus includes a receiver configured to receive downlink control information and a controller. The controller is configured to identify, from the downlink control information, one or more DM-RS ports assigned to the UE and a PDSCH EPRE to DM-RS EPRE ratio. Additionally, the controller is configured to identify data intended for the UE in a resource block in a downlink subframe using the one or more DM-RS ports and the PDSCH EPRE to DM-RS EPRE ratio. The resource block in the downlink subframe includes data for multiple users in the wireless communication system.

In another embodiment, an apparatus configured to schedule resources in a multiple-user multiple-input multiple-output wireless communication system is provided. The apparatus includes a transmitter and a controller. The controller is configured to identify one or more DM-RS ports to assign to a UE and a PDSCH EPRE to DM-RS EPRE ratio for identifying data intended for the UE in a resource block in a downlink subframe. Additionally, the controller is configured to control the transmitter to include an indication of the one or more DM-RS ports and the PDSCH EPRE to DM-RS EPRE ratio in downlink control information. The resource block in the downlink subframe includes data for multiple users in the wireless communication system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
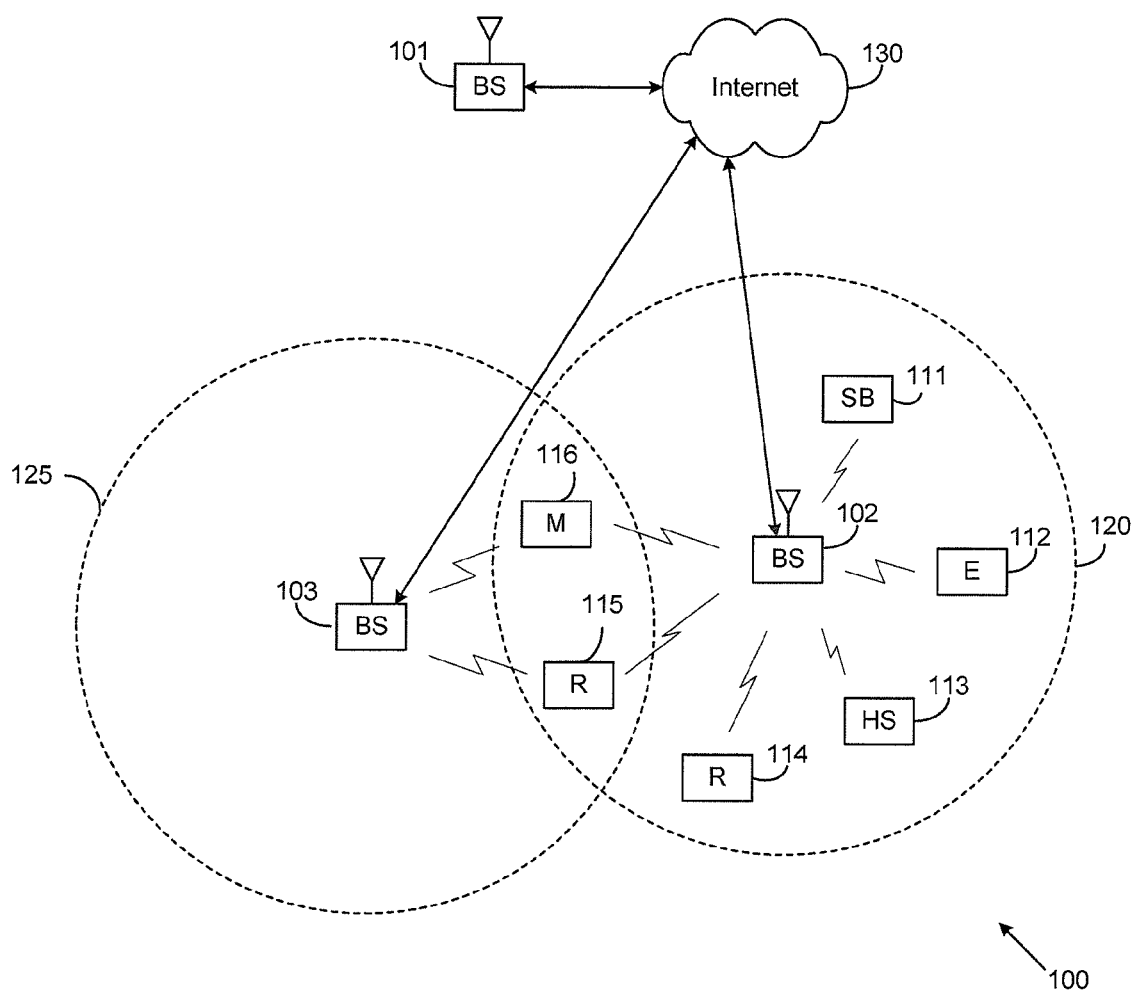
FIG. 1 illustrates an exemplary wireless system which transmits messages in accordance with an illustrative embodiment of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated into the present disclosure as if fully set forth herein: 3GPP TS 36.211 v10.3.0, "E-UTRA, Physical channels and modulation;" 3GPP TS 36.212 v10.3.0, "E-UTRA, Multiplexing and Channel coding;" 3GPP TS 36.213 v10.3.0, "E-UTRA, Physical Layer Procedures;" and 3GPP TS 36.214 v10.1.0, "E-UTRA, Physical Layer Measurement." The present application also incorporates by reference US Patent Application Publication No. 2010/0195599.

Embodiments of the present disclosure recognize that in the release 10 3GPP LIE demodulation reference signal (DM-RS) pattern, DM-RS ports 7, 8, 11, and 13 are transmitted in the same set of resource elements (REs) with code division multiplexing (CDM) group 1, whereas DM-RS ports 9, 10, 12, and 14 are transmitted in a different set of REs with CDM group 2. In release 10, LTE supports up to 4 MU-MIMO users in principle, each user up to rank 2 in a transparent manner. However, MU is optimized for rank 1 transmission to each user where only two orthogonal ports (e.g., ports 7 and 8—both located in CDM group 1) are used for MU-MIMO transmission. Unless the release 10 or 11 UE is also assigned port(s) in CDM group 2, the release 10 or 11 UEs assume REs of port(s) belonging to the CDM group 2 are used for data transmission as well. Additionally, it may not be possible to assign rank 1 or rank 2 users to CDM group 2 using the control signaling supported in release 10.

Embodiments of the present disclosure recognize that advanced wireless communication systems (e.g., such as a "Massive MIMO System" or a "Full-Dimension MIMO (FD-MIMO) System") may utilize a high number of antenna elements at the base station tower for beamforming. Embodiments of the present disclosure also recognize that as the number of antenna elements at the base station tower for beamforming increases, so too does the number of users that can be simultaneously served.

Accordingly, embodiments of the present disclosure provide methods and apparatuses to enable, support, and facilitate a high order MU-MIMO operation. In particular, embodiments of the present disclosure provide methods and apparatuses to schedule resources and identify resource scheduling in a MU-MIMO wireless communication system. Additionally, embodiments of the present disclosure recognize that signaling overhead and interference between UEs may cause limitations in the number of users that may be efficiently supported in a MU-MIMO wireless communication system. Accordingly, embodiments of the present disclosure provide methods and apparatuses to efficiently manage signaling overhead and interference between UEs to enable, support, and facilitate a high order MU-MIMO operation.

Figure 2A:
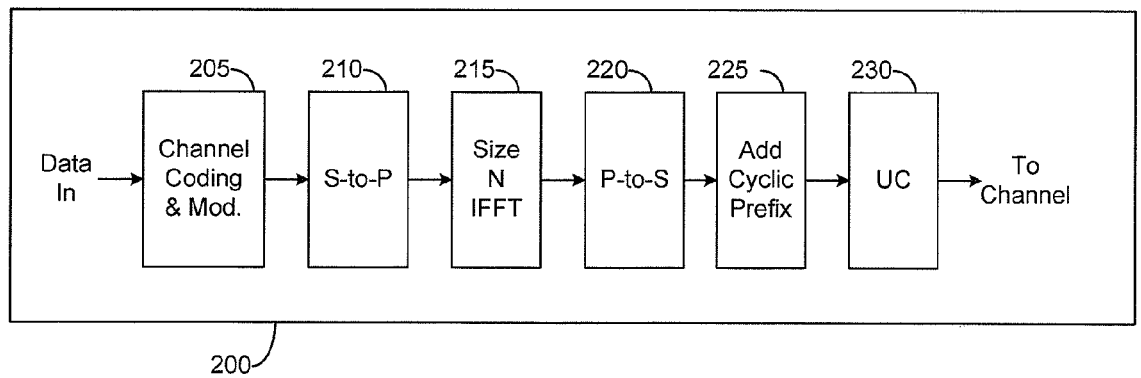
FIG. 2A illustrates a high-level diagram of an orthogonal frequency division multiple access transmit path in accordance with an illustrative embodiment of the present disclosure.
Figure 2B:
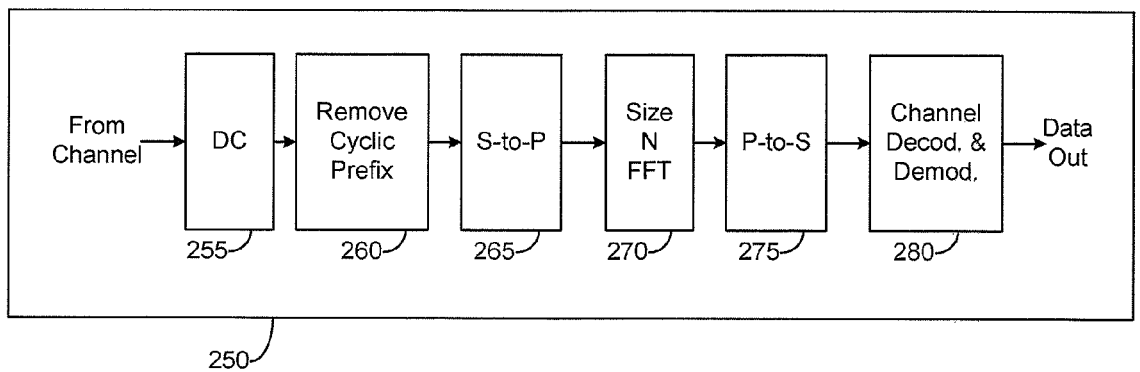
FIG. 2B illustrates a high-level diagram of an orthogonal frequency division multiple access receive path in accordance with an illustrative embodiment of the present disclosure.
Figure 3:
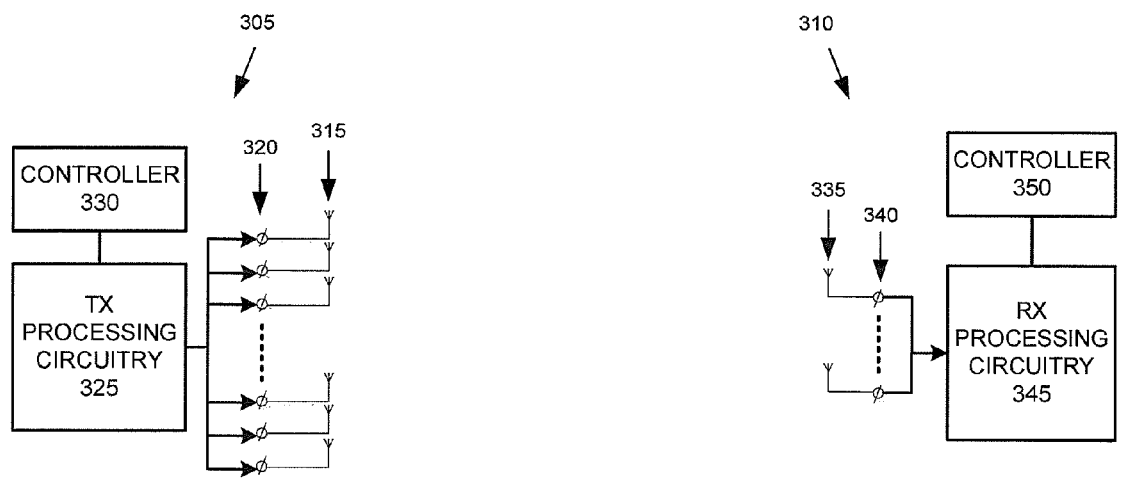
FIG. 3 illustrates a block diagram of a transmitter and a receiver in a wireless communication system that may be used to implement various embodiments of the present disclosure.

FIGS. 1-3 below describe various embodiments implemented in wireless communication systems and with the use of OFDM or OFDMA communication techniques. The description of FIGS. 1-3 is not meant to imply physical or architectural limitations to the manner in which different embodiments may be implemented. Different embodiments of the present disclosure may be implemented in any suitably arranged communications system.

FIG. 1 illustrates exemplary wireless system 100, which transmits messages according to the principles of the present disclosure. In the illustrated embodiment, wireless system 100 includes transmission points (e.g., an Evolved Node B (eNB), Node B), such as base station (BS) 101, base station (BS) 102, base station (BS) 103, and other similar base stations or relay stations (not shown). Base station 101 is in communication with base station 102 and base station 103. Base station 101 is also in communication with Internet 130 or a similar IP-based system (not shown).

Base station 102 provides wireless broadband access (via base station 101) to Internet 130 to a first plurality of UEs (e.g., mobile phone, mobile station, subscriber station) within coverage area 120 of base station 102. The first plurality of UEs includes UE 111, which may be located in a small business (SB); UE 112, which may be located in an enterprise (E); UE 113, which may be located in a WiFi hotspot (HS); UE 114, which may be located in a first residence (R); UE 115, which may be located in a second residence (R); and UE 116, which may be a mobile device (M), such as a cell phone, a wireless laptop, a wireless PDA, or the like.

Base station 103 provides wireless broadband access (via base station 101) to Internet 130 to a second plurality of UEs within coverage area 125 of base station 103. The second plurality of UEs includes UE 115 and UE 116. In an exemplary embodiment, base stations 101-103 may communicate with each other and with UE 111-116 using OFDM or OFDMA techniques.

While only six UEs are depicted in FIG. 1, it is understood that wireless system 100 may provide wireless broadband access to additional UEs. It is noted that UE 115 and UE 116 are located on the edges of both coverage area 120 and coverage area 125. UE 115 and UE 116 each communicate with both base station 102 and base station 103 and may be said to be operating in handoff mode, as known to those of skill in the art.

UEs 111-116 may access voice, data, video, video conferencing, and/or other broadband services via Internet 130. In an exemplary embodiment, one or more of UEs 111-116 may be associated with an access point (AP) of a WiFi WLAN. UE 116 may be any of a number of mobile devices, including a wireless-enabled laptop computer, personal data assistant, notebook, handheld device, or other wireless-enabled device. UEs 114 and 115 may be, for example, a wireless-enabled personal computer (PC), a laptop computer, a gateway, or another device.

FIG. 2A is a high-level diagram of transmit path circuitry 200. For example, the transmit path circuitry 200 may be used for an orthogonal frequency division multiple access (OFDMA) communication. FIG. 2B is a high-level diagram of receive path circuitry 250. For example, the receive path circuitry 250 may be used for an orthogonal frequency division multiple access (OFDMA) communication. In FIGS. 2A and 2B, for downlink communication, the transmit path circuitry 200 may be implemented in base station (BS) 102 or a relay station, and the receive path circuitry 250 may be implemented in a UE (e.g. UE 116 of FIG. 1). In other examples, for uplink communication, the receive path circuitry 250 may be implemented in a base station (e.g. base station 102 of FIG. 1) or a relay station, and the transmit path circuitry 200 may be implemented in a UE (e.g. UE 116 of FIG. 1).

Transmit path circuitry 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. Receive path circuitry 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, and channel decoding and demodulation block 280.

At least some of the components in FIGS. 2A and 2B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path circuitry 200, channel coding and modulation block 205 receives a set of information bits, applies coding (e.g., Turbo coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel, and reverse operations to those at BS 102 are performed. Down-converter 255 down-converts the received signal to baseband frequency, and remove cyclic prefix block 260 removes the cyclic prefix to produce the serial time-domain baseband signal. Serial-to-parallel block 265 converts the time-domain baseband signal to parallel time-domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to UEs 111-116 and may implement a receive path that is analogous to receiving in the uplink from UEs 111-116. Similarly, each one of UEs 111-116 may implement a transmit path corresponding to the architecture for transmitting in the uplink to base stations 101-103 and may implement a receive path corresponding to the architecture for receiving in the downlink from base stations 101-103.

FIG. 3 illustrates a block diagram of a transmitter 305 and a receiver 310 in a wireless communication system that may be used to implement various embodiments of the present disclosure. In this illustrative example, the transmitter 305 and the receiver 310 are devices at a communication point in a wireless communications system, such as, for example, wireless system 100 in FIG. 1. In some embodiments, the transmitter 305 or the receiver 310 may be a network entity, such as a base station, e.g., evolved node B (eNB), or remote-radio head, a relay station, or underlay base station; gateway (GW); or base station controller (BSC). In other embodiments, the transmitter 305 or the receiver 310 may be a UE (e.g., mobile station, subscriber station, etc.). In one example, the transmitter 305 or the receiver 310 is an example of one embodiment of the UE 116 in FIG. 1. In another example, the transmitter 305 or the receiver 310 is an example of one embodiment of the base station 102 in FIG. 1.

The transmitter 305 comprises antenna array 315, phase shifters 320, TX processing circuitry 325, and controller 330. The transmitter 305 receives analog or digital signals from outgoing baseband data. Transmitter 305 encodes, multiplexes, and/or digitizes the outgoing baseband data to produce a processed RF signal that is sent and/or transmitted via transmitter 305. For example, the TX processing circuitry 325 may implement a transmit path that is analogous to the transmit processing circuitry 200 in FIG. 2. Transmitter 305 may also perform spatial multiplexing via layer mapping to different antennas in antenna array 315 to transmit signals in multiple different beams. The controller 330 controls the overall operation of transmitter 305. In one such operation, controller 330 controls the transmission of signals by the transmitter 305, in accordance with well-known principles.

Receiver 310 receives from antenna(s) 335 an incoming RF signal or signals transmitted by one or more transmission points, such as base stations, relay stations, remote radio heads, UEs, etc. Receiver 310 includes RX processing circuitry 345 that processes the received signal(s) to identify the information transmitted by the transmission point(s). For example, the Rx processing circuitry 345 may down-convert the incoming RF signal(s) to produce an intermediate frequency (IF) or a baseband signal by channel estimating, demodulating, stream separating, filtering, decoding, and/or digitizing the received signal(s). For example, the Rx processing circuitry 345 may implement a receive path that is analogous to the receive processing circuitry 250 in FIG. 2B. The controller 350 controls the overall operation of the receiver 310. In one such operation, the controller 350 controls the reception of signals by the receiver 310, in accordance with well-known principles.

The illustration of transmitter 305 and receiver 310 illustrated in FIG. 3 is for the purposes of illustrating one embodiment in which embodiments of the present disclosure may be implemented. Other embodiments of the transmitter 305 and the receiver 310 could be used without departing from the scope of this disclosure. For example, the transmitter 305 may be located in communication node (e.g., BS, UE, RS, and RRH) that also includes a receiver, such as receiver 310. Similarly, the receiver 310 may be located in communication node (e.g., BS, UE, RS, and RRH) that also includes a transmitter, such as transmitter 305. Antennas in the TX and RX antenna arrays in this communication node may overlap or be the same antenna arrays used for transmission and reception via one or more antenna switching mechanisms.

In release 10 LIE, up to four MU-MIMO users may be supported in principle. For example, each user up to rank 2 and only two orthogonal ports (e.g., ports 7 and 8) may be used for MU-MIMO transmission.

For high-order MU-MIMO, the number of users simultaneously served by the BS can be increased significantly (e.g., 8, 10, 16, etc.). To enhance own channel estimation quality and also to enable MU interference suppression/cancellation, the number of orthogonal ports for MU-MIMO transmission can be increased, for example, to eight. To achieve this, eight orthogonal DM-RS ports (e.g., ports 7-14) are provided where the pseudorandom sequence generator is initialized according to equation 1 below.

$$c_{init}=(\lfloor n_s/2 \rfloor+1)\cdot(2N_{ID}^{cell}+1)\cdot 2^{16}+n_{SCID}$$ (Equation 1)

where $C_{init}$ is the initialization value of the scrambling sequence, $N_{ID}^{cell}$ is the cell identifier (ED) and $n_{SCID}$ is the scrambling code. The scrambling sequence itself can be generated according to 3GPP TS 36.211 §6.10.3.1. As each DM-RS port has two scrambling IDs ($N_{ID}^{cell}$), two semi-orthogonal DM-RS resources are provided and the total number of users that can be simultaneously served by the base station is 16, with a rank 1 transmission to each user. If the cell identifier in the DM-RS pseudorandom sequence generation initialization is replaced with a parameter "x", which is configurable by the network entity, (e.g. by an RRC) then the total number of users that can be simultaneously served by the base station can be further increased.

Figure 4A:
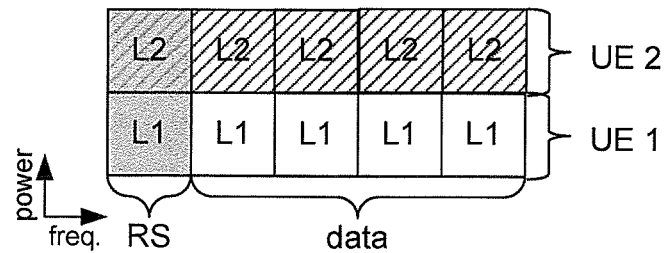
FIGS. 4A-C illustrate examples of orthogonal or semi-orthogonal MU-MIMO multiplexing in accordance with embodiments of the present disclosure.
Figure 4B:
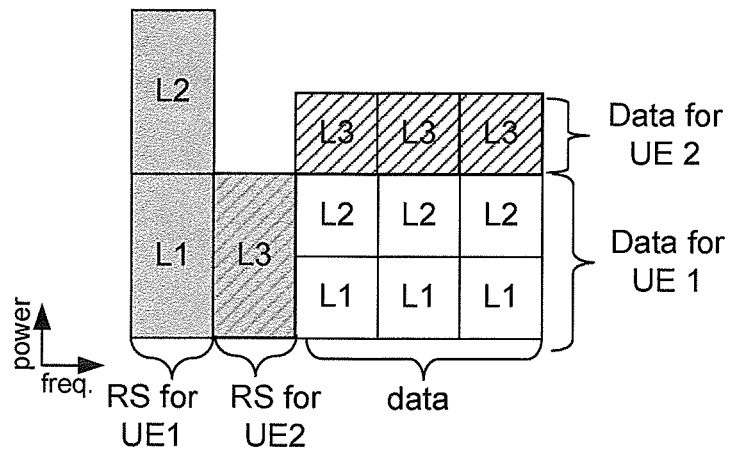
Figure 4C:
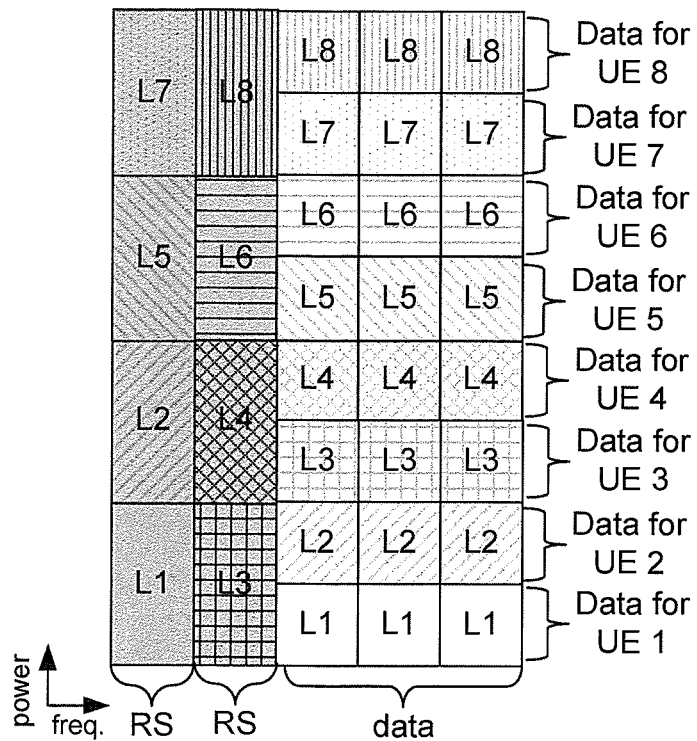

FIGS. 4A-C illustrate examples of orthogonal or semi-orthogonal MU-MIMO multiplexing in accordance with embodiments of the present disclosure. FIG. 4A illustrates a frequency resource for two RS orthogonally or semi-orthogonally multiplexed to provide one reference signal per UE to two UEs and the corresponding multiplexing of the frequency resources for the data intended for the respective UEs. FIG. 4B illustrates two frequency resources used for two RSs for three UEs with data intended for the respective UEs orthogonally or semi-orthogonally multiplexed among the frequency resources for data. FIG. 4C illustrates two frequency resources for eight RSs orthogonally or semi-orthogonally multiplexed to provide reference signals to eight UEs. The data for the UEs is orthogonally or semi-orthogonally multiplexed among the frequency resources for data. In various embodiments, the network entity may assign the DM-RS resources such that UEs with relatively higher inter-user interference have orthogonal DM-RS resources, while UEs with relatively low inter-user interference may be assigned DM-RS resources that are semi-orthogonal.

Figure 5:
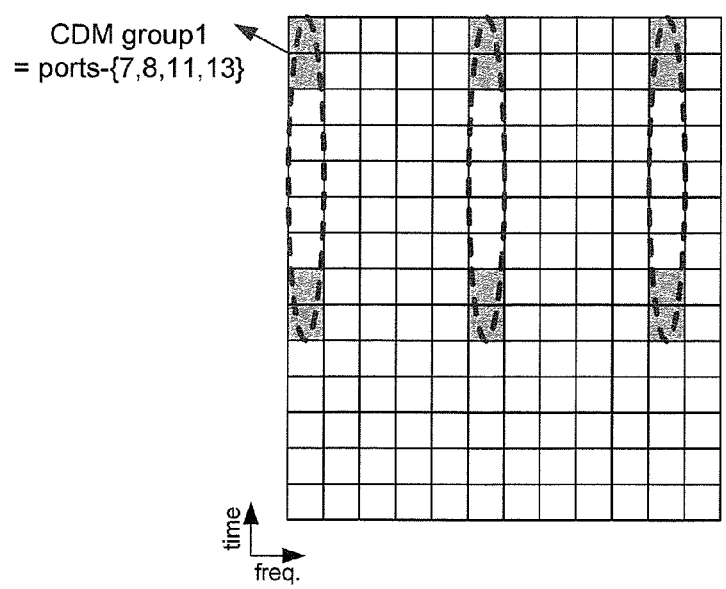
FIG. 5 illustrates a signaling pattern for MU-MIMO multiplexing using ports of the same CDM group in accordance with various embodiments of the present disclosure.

FIG. 5 illustrates a signaling pattern for MU-MIMO multiplexing using ports of a same CDM group in accordance with various embodiments of the present disclosure. To facilitate MU-MIMO multiplexing between UEs, various embodiments include assignment of ports belonging to a same CDM group (e.g., ports 11 and 13). In other words, in one physical resource block (PRB), the DM-RS ports used by the network entity for MU-MIMO multiplexing may include only ports of the same CDM group, for example, ports 7, 8, 11, and 13 as illustrated in FIG. 5, while the ports belonging to different CDM group (e.g., ports 9, 10, 12, and 14) are not transmitted, and the corresponding REs may be used for data transmission. An additional advantage of this design is that the overhead for the DM-RS may be reduced.

Figure 6:
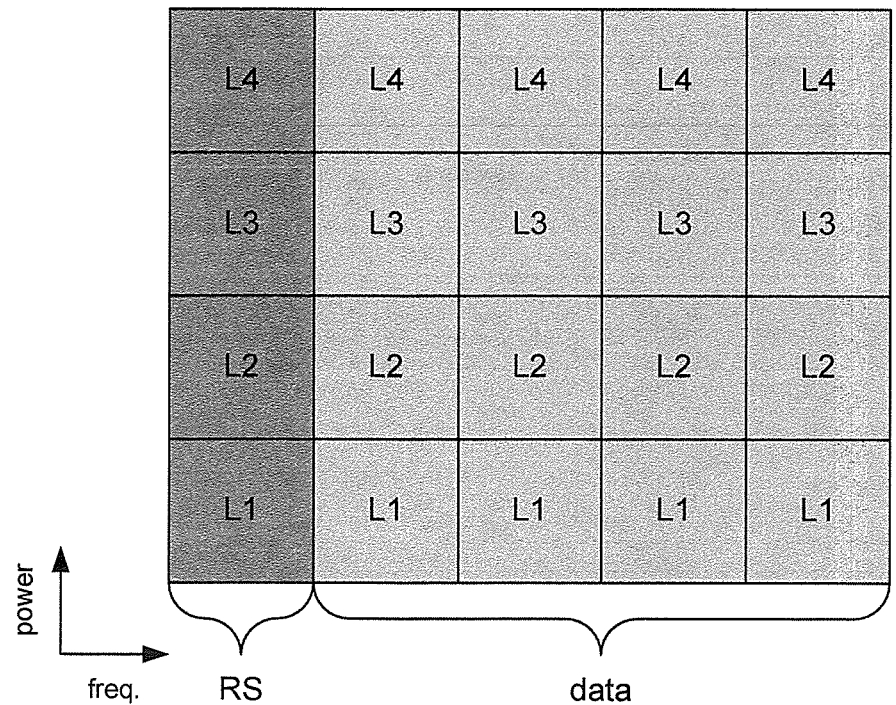
FIG. 6 illustrates an example of orthogonal or semi-orthogonal MU-MIMO multiplexing where the PDSCH EPRE to DM-RS EPRE ratio is assumed to be 0 dB in accordance with embodiments of the present disclosure.

Additionally, this design also does not impact the PDSCH EPRE to DM-RS EPRE ratio assumed by legacy UEs (e.g., assumed to be 0 dB). The high order MU-MIMO UEs can also assume that the PDSCH EPRE to DM-RS EPRE ratio is 0 dB. For example, FIG. 6 illustrates an example of orthogonal or semi-orthogonal MU-MIMO multiplexing where the PDSCH EPRE to DM-RS EPRE ratio is assumed to be 0 dB in accordance with embodiments of the present disclosure.

In some embodiments, the resource elements for the UEs may be multiplexed using only two ports (e.g., ports 7 and 8), for example, by assigning different scrambling ID for different UEs assigned the same DM-RS port.

Additionally, in various embodiments, DM-RS ports of CDM group 2 may be used for MU-MIMO multiplexing by the network entity if one or more DM-RS ports of CDM group 1 are also used. In one example, if a UE is assigned only port(s) from CDM group 2, the UE may assume that the REs corresponding to the DM-RS of CDM group 1 are not used for data transmission. This use of DM-RS ports of CDM group 2 also enables a UE to be multiplexed with a legacy UE that is assigned with rank that is greater than 2.

In various embodiments, the network entity may provide control signaling to indicate the scheduling of the resources to support the high-order MU-MIMO operations of the present disclosure. The control signaling provided by the network entity may include at least one and possibly more of: the DM-RS Port(s) assigned to the UE; a physical downlink shared channel (PDSCH) energy per resource element (EPRE) to DM-RS EPRE ratio; whether rate matching around unassigned port(s) in another DM-RS CDM group should be applied; and the existence of interfering UEs.

The PDSCH EPRE to DM-RS EPRE ratio is a ratio of the average power of the signal intended for the UE compared with the average power of another signal that may be present in the resource element. For example, a signal in a resource element intended for a UE may be separated and distinguished from a signal in the same resource element that is intended to convey different information than the other signal based on the PDSCH EPRE to DM-RS EPRE ratio (e.g., a –3 dB average power difference between the signals). Even if UE is assigned 2 or less than 2 layers, other DM-RS CDM groups may be assigned to other UEs. If the UE is not assigned any ports belonging to a DM-RS CDM group, the control signaling may indicate whether the UE should assume data is mapped to the REs of that DM-RS CDM group or not (e.g., whether rate matching around unassigned port(s) in another DM-RS CDM group should be applied). The control signaling may also indicate the existence of interfering UEs. For example, the control signaling from the network entity may indicate whether the DM-RS port(s) not assigned to the UE is assigned to another UE. The explicit signaling of interfering UEs may avoid the need for the UE to use blind detection of the existence of an interfering UE.

In various embodiments, the network entity may enable dynamic single user (SU) and MU scheduling. For example, a base station may provide dynamic control signaling (e.g. provided in a downlink control information (DCI) format) which can be supported to indicate whether SU or MU scheduling is being used.

Indicating the DM-RS ports, the PDSCH EPRE to DM-RS EPRE ratio, rate matching, and the existence of interfering UEs may require significant signaling overhead to fully support and enable MU-MIMO operation. Various embodiments utilize signaling techniques to reduce the signaling overhead associated with implementing the MU-MIMO operation of the present disclosure. For example, in some embodiments, the network entity may only assign each MU-MIMO UE up to rank 2 spatial multiplexing and may jointly code the power offset and rate matching. For example, a single bit field may jointly indicate the power offset and rate matching assumption. In one illustrative embodiment, the network entity may introduce or reuse one bit from an existing bit in the DCI format to indicate the power offset and rate matching, for example, as shown in Table 1 below. In another example, this information can be jointly encoded with other fields, for example, a bit field used to indicate antenna port(s), scrambling identity, and/or number of layers may also be used to jointly indicate the power offset and/or rate matching assumption.

TABLE 1

Power offset and rate matching signaling

| Signaled value | PDSCH EPRE to DM-RS EPRE ratio | Rate matching around not assigned CDM group |
|---|---|---|
| 0 | 0 dB | No |
| 1 | −3 dB | Yes |

In some embodiments, if the UE is assigned port(s) that are not DM-RS ports 7 and/or 8, the UE may assume that the PDSCH EPRE-to-DM-RS EPRE ratio of −3 dB and rate matching applied when receiving PDSCH in the assigned resource blocks. If UE is assigned ports 7 and/or 8, the network entity may provide additional signaling to indicate what PDSCH EPRE-to-DM-RS EPRE ratio and rate matching are to be assumed.

In other embodiments, if UE is assigned port(s) that do not belong to DM-RS CDM group 1, the UE may assume a PDSCH EPRE-to-DM-RS EPRE ratio of −3 dB and rate matching around REs belonging to DM-RS CDM group 1 when receiving PDSCH in the assigned resource blocks. If UE is only assigned ports in CDM group 1 and not in CDM group 2, the network entity may provide additional signaling to indicate what PDSCH EPRE to DM-RS EPRE ratio and whether rate matching around REs belonging to CDM group 2 are to be assumed. In these embodiments, DM-RS CDM group 1 is implicitly prioritized for assignment.

In one example, the baseline DCI format design can be similar to DCI format 2C in release 10, with at least the following exception: the bit field used for joint coding of antenna port(s), scrambling identity and number of layers is extended to allow enhanced support for MU-MIMO (see e.g., Tables 2 and 3 where 5 bits are used). One example of the DM-RS mapping as described above is also illustrated in these tables. For example, for one codeword transmission, the power offset and rate matching can be indicated by an existing field reserved for the second codeword, (e.g. the New Data Indicator (NDI) of the disabled TB). One example of the extension of bit field used for joint coding of antenna port(s), scrambling identity, and number of layers for one codeword transmission is illustrated in Table 2 below.

TABLE 2

One Codeword:
Codeword 0 enabled,
Codeword 1 disabled

| Value | Message |
|---|---|
| 0 | 1 layer, port 7, $n_{SCID} = 0$ |
| 1 | 1 layer, port 7, $n_{SCID} = 1$ |
| 2 | 1 layer, port 8, $n_{SCID} = 0$ |
| 3 | 1 layer, port 8, $n_{SCID} = 1$ |
| 4 | 2 layers, ports 7-8, $n_{SCID} = 0$ |
| 5 | 3 layers, ports 7-9 (−3 dB PO) |
| 6 | 4 layers, ports 7-10 (−3 dB PO) |
| 7 | 1 layer, port 9, $n_{SCID} = 0$ |
| 8 | 1 layer, port 9, $n_{SCID} = 1$ |
| 9 | 1 layer, port 10, $n_{SCID} = 0$ |
| 10 | 1 layer, port 10, $n_{SCID} = 1$ |
| 11 | 1 layer, port 11, $n_{SCID} = 0$ |
| 12 | 1 layer, port 11, $n_{SCID} = 1$ |
| 13 | 1 layer, port 12, $n_{SCID} = 0$ |
| 14 | 1 layer, port 12, $n_{SCID} = 1$ |
| 15 | 1 layer, port 13, $n_{SCID} = 0$ |
| 16 | 1 layer, port 13, $n_{SCID} = 1$ |
| 17 | 1 layer, port 14, $n_{SCID} = 0$ |
| 18 | 1 layer, port 14, $n_{SCID} = 1$ |
| 19 | 2 layers, ports 7-8, $n_{SCID} = 1$ |
| 20 | 2 layers, ports 9-10, $n_{SCID} = 0$ |
| 21 | 2 layers, ports 9-10, $n_{SCID} = 1$ |
| 22 | 2 layers, ports 11, 13, $n_{SCID} = 0$ |
| 23 | 2 layers, ports 11, 13, $n_{SCID} = 1$ |
| 24 | 2 layers, ports 12, 14, $n_{SCID} = 0$ |
| 25 | 2 layers, ports 12, 14, $n_{SCID} = 1$ |
| 26 | Reserved |
| 27 | Reserved |
| 28 | Reserved |
| 29 | Reserved |
| 30 | Reserved |
| 31 | Reserved |

For more than two layer transmissions, if only −3 dB power offset is supported, the bit to indicate power offset value may be ignored by the UE. For two-codeword transmission, the power offset and rate matching assumption can also be jointly encoded with the antenna port(s), scrambling identity, and number of layers as there are enough reserved bits, as shown in Table 3 below. One example of the extension of bit field used for joint coding of antenna port(s), scrambling identity, and number of layers for two codeword transmission is illustrated in Table 3.

TABLE 3

Two Codewords:
Codeword 0 enabled,
Codeword 1 enabled

| Value | Message |
|---|---|
| 0 | 2 layers, ports 7-8, $n_{SCID} = 0$ (0 dB PO) |
| 1 | 2 layers, ports 7-8, $n_{SCID} = 1$ (0 dB PO) |
| 2 | 3 layers, ports 7-9 (−3 dB PO) |
| 3 | 4 layers, ports 7-10 (−3 dB PO) |
| 4 | 5 layers, ports 7-11 (−3 dB PO) |
| 5 | 6 layers, ports 7-12 (−3 dB PO) |
| 6 | 7 layers, ports 7-13 (−3 dB PO) |
| 7 | 8 layers, ports 7-14 (−3 dB PO) |
| 8 | 2 layers, ports 9-10, $n_{SCID} = 0$, −3 dB PO & RM |
| 9 | 2 layers, ports 9-10, $n_{SCID} = 1$, −3 dB PO & RM |
| 10 | 2 layers, ports 11, 13, $n_{SCID} = 0$, −3 dB PO & RM |
| 11 | 2 layers, ports 11, 13, $n_{SCID} = 1$, −3 dB PO & RM |
| 12 | 2 layers, ports 12, 14, $n_{SCID} = 0$, −3 dB PO & RM |
| 13 | 2 layers, ports 12, 14, $n_{SCID} = 1$, −3 dB PO & RM |
| 14 | 2 layers, ports 7-8, $n_{SCID} = 0$, −3 dB PO & RM |
| 15 | 2 layers, ports 7-8, $n_{SCID} = 1$, −3 dB PO & RM |
| 16 | 2 layers, ports 11, 13, $n_{SCID} = 0$ (0 dB PO) |
| 17 | 2 layers, ports 11, 13, $n_{SCID} = 1$ (0 dB PO) |
| 18 | Reserved |
| 19 | Reserved |
| 20 | Reserved |
| 21 | Reserved |
| 22 | Reserved |
| 23 | Reserved |
| 24 | Reserved |
| 25 | Reserved |
| 26 | Reserved |
| 27 | Reserved |
| 28 | Reserved |
| 29 | Reserved |
| 30 | Reserved |
| 31 | Reserved |

In other examples, the power offset and rate matching information can also be jointly encoded with the antenna port(s), scrambling ID, and number of layers regardless of the number of codewords assigned (e.g., the bit field can be extended to 6 bits). Other alternatives, such as joint encoding of antenna port(s), number of layers and power offset (PO) and rate matching (RM) information instead, and a separate bit for scrambling ID may also be used.

In another example, joint coding of antenna port(s), scrambling identity, number of layers, power offset, and rate matching assumption may be indicated as illustrated in the exemplary coding format in Table 4 and Table 5 for one codeword assignment and two codewords assignment, respectively. In these examples, the one advantage is that only 5 bits may be needed to include the power offset and rate matching information.

One example of joint encoding of antenna port(s), scrambling identity, number of layers, PDSCH EPRE to DM-RS power ratio, and rate matching for one codeword transmissions is illustrated in Table 4 below.

TABLE 4

One Codeword:
Codeword 0 enabled,
Codeword 1 disabled

| Value | Message |
|---|---|
| 0 | 1 layer, port 7, $n_{SCID} = 0$ (0 dB PO) |
| 1 | 1 layer, port 7, $n_{SCID} = 1$ (0 dB PO) |
| 2 | 1 layer, port 8, $n_{SCID} = 0$ (0 dB PO) |
| 3 | 1 layer, port 8, $n_{SCID} = 1$ (0 dB PO) |
| 4 | 2 layers, ports 7-8, $n_{SCID} = 0$ (0 dB PO) |
| 5 | 3 layers, ports 7-9 (−3 dB PO) |
| 6 | 4 layers, ports 7-10 (−3 dB PO) |
| 7 | 1 layer, port 9, $n_{SCID} = 0$, −3 dB PO & RM |
| 8 | 1 layer, port 9, $n_{SCID} = 1$, −3 dB PO & RM |
| 9 | 1 layer, port 10, $n_{SCID} = 0$, −3 dB PO & RM |
| 10 | 1 layer, port 10, $n_{SCID} = 1$, −3 dB PO & RM |
| 11 | 1 layer, port 11, $n_{SCID} = 0$, −3 dB PO & RM |
| 12 | 1 layer, port 11, $n_{SCID} = 1$, −3 dB PO & RM |
| 13 | 1 layer, port 12, $n_{SCID} = 0$, −3 dB PO & RM |
| 14 | 1 layer, port 12, $n_{SCID} = 1$, −3 dB PO & RM |
| 15 | 1 layer, port 13, $n_{SCID} = 0$, −3 dB PO & RM |
| 16 | 1 layer, port 13, $n_{SCID} = 1$, −3 dB PO & RM |
| 17 | 1 layer, port 14, $n_{SCID} = 0$, −3 dB PO & RM |
| 18 | 1 layer, port 14, $n_{SCID} = 1$, −3 dB PO & RM |
| 19 | 2 layers, ports 7-8, $n_{SCID} = 1$ (0 dB PO) |
| 20 | 2 layers, ports 9-10, $n_{SCID} = 0$, −3 dB PO & RM |
| 21 | 2 layers, ports 9-10, $n_{SCID} = 1$, −3 dB PO & RM |
| 22 | 2 layers, ports 11, 13, $n_{SCID} = 0$, −3 dB PO & RM |
| 23 | 2 layers, ports 11, 13, $n_{SCID} = 1$, −3 dB PO & RM |
| 24 | 2 layers, ports 12, 14, $n_{SCID} = 0$, −3 dB PO & RM |
| 25 | 2 layers, ports 12, 14, $n_{SCID} = 1$, −3 dB PO & RM |
| 26 | 1 layer, port 7, $n_{SCID} = 0$, −3 dB PO & RM |
| 27 | 1 layer, port 7, $n_{SCID} = 1$, −3 dB PO & RM |
| 28 | 1 layer, port 8, $n_{SCID} = 0$, −3 dB PO & RM |
| 29 | 1 layer, port 8, $n_{SCID} = 1$, −3 dB PO & RM |
| 30 | 2 layers, ports 7-8, $n_{SCID} = 0$, −3 dB PO & RM |
| 31 | 2 layers, ports 7-8, $n_{SCID} = 1$, −3 dB PO & RM |

One example of joint encoding of antenna port(s), scrambling identity, number of layers, PDSCH EPRE to DM-RS power ratio and rate matching for two codeword transmissions is illustrated in Table 5 below.

TABLE 5

Two Codewords:
Codeword 0 enabled,
Codeword 1 enabled

| Value | Message |
|---|---|
| 0 | 2 layers, ports 7-8, $n_{SCID}$ = 0 (0 dB PO) |
| 1 | 2 layers, ports 7-8, $n_{SCID}$ = 1 (0 dB PO) |
| 2 | 3 layers, ports 7-9 (−3 dB PO) |
| 3 | 4 layers, ports 7-10 (−3 dB PO) |
| 4 | 5 layers, ports 7-11 (−3 dB PO) |
| 5 | 6 layers, ports 7-12 (−3 dB PO) |
| 6 | 7 layers, ports 7-13 (−3 dB PO) |
| 7 | 8 layers, ports 7-14 (−3 dB PO) |
| 8 | 2 layers, ports 9-10, $n_{SCID}$ = 0, −3 dB PO & RM |
| 9 | 2 layers, ports 9-10, $n_{SCID}$ = 1, −3 dB PO & RM |
| 10 | 2 layers, ports 11, 13, $n_{SCID}$ = 0, −3 dB PO & RM |
| 11 | 2 layers, ports 11, 13, $n_{SCID}$ = 1, −3 dB PO & RM |
| 12 | 2 layers, ports 12, 14, $n_{SCID}$ = 0, −3 dB PO & RM |
| 13 | 2 layers, ports 12, 14, $n_{SCID}$ = 1, −3 dB PO & RM |
| 14 | 2 layers, ports 7-8, $n_{SCID}$ = 0, −3 dB PO & RM |
| 15 | 2 layers, ports 7-8, $n_{SCID}$ = 1, −3 dB PO & RM |
| 16 | 2 layers, ports 11, 13, $n_{SCID}$ = 0 (0 dB PO) |
| 17 | 2 layers, ports 11, 13, $n_{SCID}$ = 1 (0 dB PO) |
| 18 | Reserved |
| 19 | Reserved |
| 20 | Reserved |
| 21 | Reserved |
| 22 | Reserved |
| 23 | Reserved |
| 24 | Reserved |
| 25 | Reserved |
| 26 | Reserved |
| 27 | Reserved |
| 28 | Reserved |
| 29 | Reserved |
| 30 | Reserved |
| 31 | Reserved |

In another example, if two layer transmission is not supported by the DCI format, joint encoding of antenna port(s), scrambling identity, number of layers, PDSCH EPRE to DM-RS power ratio, and rate matching may still be accomplished as illustrated, for example, in Table 6. One example of joint encoding of antenna port(s), scrambling identity, number of layers, PDSCH EPRE to DM-RS power ratio, and rate matching for one codeword transmissions is illustrated in Table 6 below.

TABLE 6

One Codeword: Codeword 0

| Value | Message |
|---|---|
| 0 | 1 layer, port 7, $n_{SCID}$ = 0 (0 dB PO) |
| 1 | 1 layer, port 7, $n_{SCID}$ = 1 (0 dB PO) |
| 2 | 1 layer, port 8, $n_{SCID}$ = 0 (0 dB PO) |
| 3 | 1 layer, port 8, $n_{SCID}$ = 1 (0 dB PO) |
| 4 | 1 layer, port 7, $n_{SCID}$ = 0, −3 dB PO & RM |
| 5 | 1 layer, port 7, $n_{SCID}$ = 1, −3 dB PO & RM |
| 6 | 1 layer, port 8, $n_{SCID}$ = 0, −3 dB PO & RM |
| 7 | 1 layer, port 8, $n_{SCID}$ = 1, −3 dB PO & RM |
| 8 | 1 layer, port 9, $n_{SCID}$ = 0, −3 dB PO & RM |
| 9 | 1 layer, port 9, $n_{SCID}$ = 1, −3 dB PO & RM |
| 10 | 1 layer, port 10, $n_{SCID}$ = 0, −3 dB PO & RM |
| 11 | 1 layer, port 10, $n_{SCID}$ = 1, −3 dB PO & RM |
| 12 | 1 layer, port 11, $n_{SCID}$ = 0 (0 dB PO) |
| 13 | 1 layer, port 11, $n_{SCID}$ = 1 (0 dB PO) |
| 14 | 1 layer, port 11, $n_{SCID}$ = 0, −3 dB PO & RM |
| 15 | 1 layer, port 11, $n_{SCID}$ = 1, −3 dB PO & RM |
| 16 | 1 layer, port 12, $n_{SCID}$ = 0, −3 dB PO & RM |
| 17 | 1 layer, port 12, $n_{SCID}$ = 1, −3 dB PO & RM |
| 18 | 1 layer, port 13, $n_{SCID}$ = 0 (0 dB PO) |
| 19 | 1 layer, port 13, $n_{SCID}$ = 1 (0 dB PO) |
| 20 | 1 layer, port 13, $n_{SCID}$ = 0, −3 dB PO & RM |
| 21 | 1 layer, port 13, $n_{SCID}$ = 1, −3 dB PO & RM |
| 22 | 1 layer, port 14, $n_{SCID}$ = 0, −3 dB PO & RM |
| 23 | 1 layer, port 14, $n_{SCID}$ = 1, −3 dB PO & RM |
| 24 | Reserved |
| ... | ... |
| 31 | Reserved |

Various embodiments of the present disclosure provide advanced MU interference suppression and/or cancellation support. For example, if advanced MU interference cancellation/suppression is supported by the UE, the network entity may indicate one or more of the following to the UE: the modulation and coding scheme (MCS) of interfering UEs (an interfering UE assigned with rank 2 may be identified as two virtual interfering UEs of rank 1), port(s) of interfering UEs, the number of interfering UEs, UE ID (e.g., C-RNTI) of interfering UEs, and/or the DM-RS port scrambling ID of the interfering UEs. In these interference reduction examples, signaling overhead may be reduced and/or managed by signaling the information of only the interfering UEs that are strong interferers or have an interference over a threshold. In other words, not all the information of all interfering UEs may be signaled to reduce signaling overhead. For example, interfering UEs that are assigned orthogonal DM-RS ports with respect to the desired UE may not be considered as UEs that are strong interferers.

Figure 7:
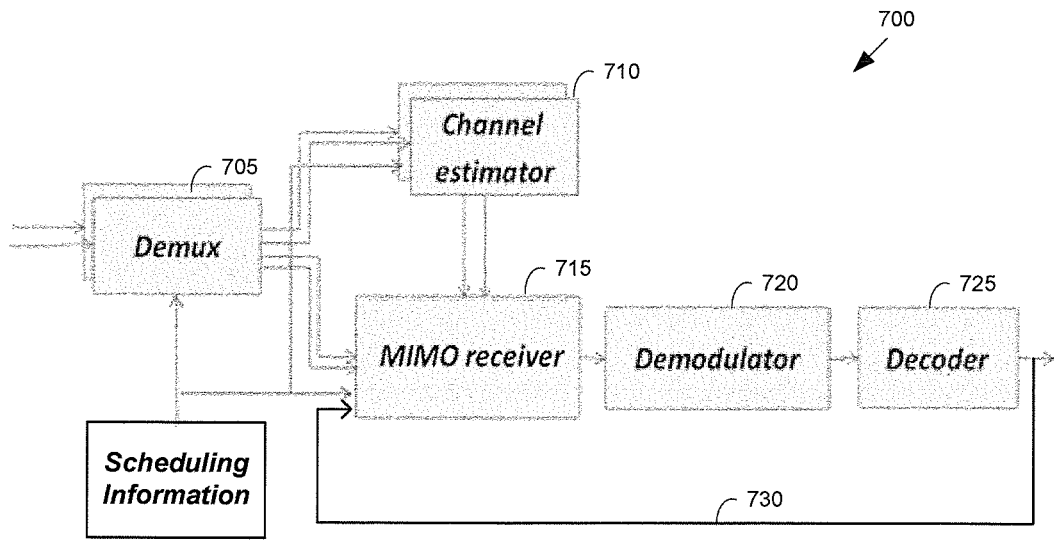
FIG. 7 illustrates a block diagram of a UE capable of performing advanced multiple-user interference cancellation and/or suppression in accordance with illustrative embodiments of the present disclosure.

FIG. 7 illustrates a block diagram of a UE 700 capable of performing advanced multi-user interference cancellation and/or suppression in accordance with illustrative embodiments of the present disclosure. For example, as illustrated, the de-multiplexer 705, channel estimator 710, and/or the MIMO (SU or MU) receiver 715 may utilize the information about the interfering UEs that was signaled in the control information received from the network entity as described above. To enable the advanced multi-user interference cancellation and/or suppression, the de-multiplexer 705 may receive signals from multiple ports. The channel estimator 710 may receive and estimate the channel using the RS of UE 700 and the interfering UE(s). The MIMO receiver 715 receives the channel estimate from the channel estimator 710 and uses the estimate of the channel to reduce interference that may be present in the signals intended to be received by the UE. The demodulator 720 demodulates the received signals for decoding of the received signal by the decoder 725.

Additionally or alternatively, in various embodiments, the UE 700 may include a feedback loop 730 for canceling and/or subtracting interference of interfering UE(s) from the received signal. For example, given that the UE 700 information about the interfering UE(s), the UE 700 can decode and reconstruct the interfering signal(s), which can be fed back to the MIMO receiver 715 to subtract the interfering signal(s) for interference cancellation/suppression. Whether the UE 700 includes the feedback loop 730 canceling and/or subtracting interference of interfering UE(s) in addition to or instead of the interference suppression techniques described above is an implementation choice and embodiments of the present disclosure may include any combination of the cancellation and/or suppression techniques described herein.

The control signaling for interference reduction can be provided in a dynamic manner via DCI signaling. In one example embodiment, reduction in signaling overhead may be achieved by associating each DM-RS port with a port scrambling ID for PDSCH. In particular, PDSCH transmitted using a DM-RS port is scrambled with its port scrambling ID instead of the C-RNTI of the UE. For example, the initialization value of the scrambling sequence may be calculated as provided in equation 2 below:

$$c_{init} = n_{Port\text{-}ID} \cdot 2^{14} + q \cdot 2^{13} + \lfloor n_s/2 \rfloor \cdot 2^9 N_{ID}^{cell} \quad \text{(Equation 2)}$$

where $n_{Port\text{-}ID}$ is the DM-RS port scrambling ID. Signaling of the interfering UE's DM-RS port scrambling ID has significantly lower overhead than signaling of C-RNTI. For example, if 8 ports are defined, only 3 bits are required for signaling of the DM-RS port scrambling ID, compared to 16 bits for C-RNTI signaling.

In another embodiment, only one codeword/transport block may be assigned to the desired UE. The bit field of the unused transport block in the DCI format (e.g. 2C/2D) may be used or reused to indicate the information of the interfering UE. In one example, assuming only transport block 1 is assigned to a UE, the MCS field of transport block 2 can be used to indicate the MCS of the interfering UE. The redundancy version and the NDI bits (3 bits total) for transport block 2 can also be used or reused to indicate the DM-RS port index of the interfering UE. One example of reinterpretation of fields in DCI format (e.g. 2C/2D) is illustrated in Table 7 below.

TABLE 7

| Field in DCI format (e.g. 2C/2D) | Interpretation |
|---|---|
| MCS of TB 2 | MCS of interfering UE |
| RV and NDI of TB2 | Port index of interfering UE |

Figure 8:
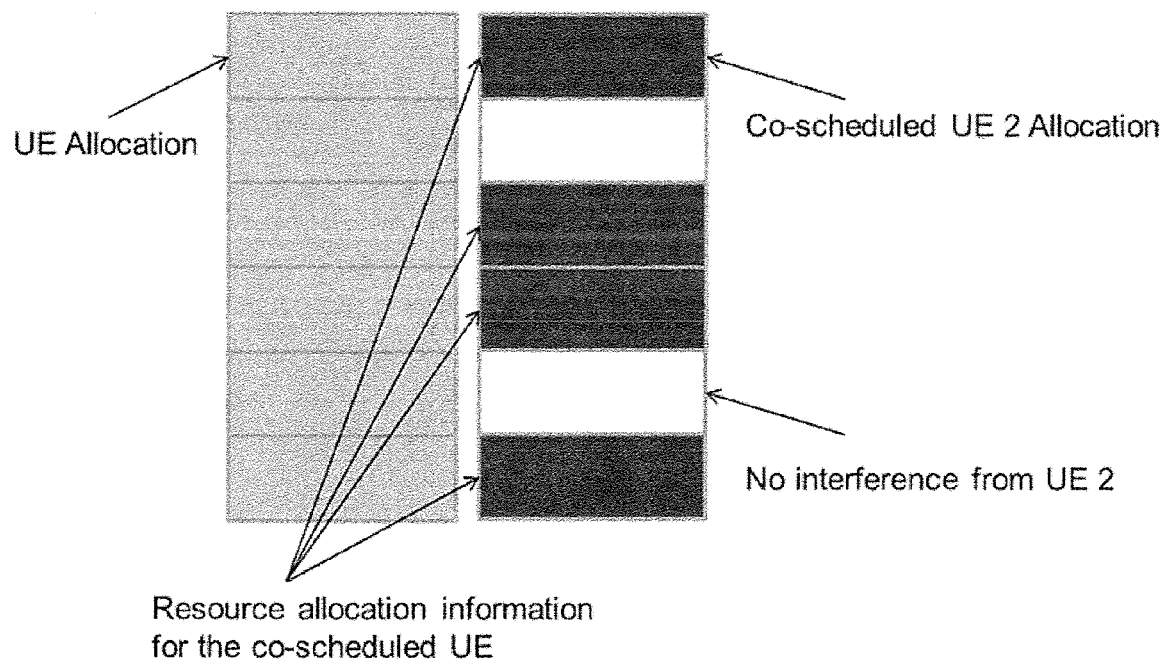
FIG. 8 illustrates an indication of resource assignments for a UE having an overlapping allocation of resource blocks in accordance with various embodiments of the present disclosure.

FIG. 8 illustrates an indication of resource assignments for a UE having an overlapping allocation of resource blocks in accordance with various embodiments of the present disclosure. To effectively enable interference cancellation as described above, UEs may be scheduled with an overlapping allocation of RBs in frequency. While this scheduling scheme may somewhat limit scheduling flexibility, this scheduling scheme may reduce the signaling overhead for interference reduction. For example, the network entity may define a group of RBs over which the same set of UEs is allocated the same set of DMRS ports. Since the amount of coded data sent to each UE may be different, a UE may have to further detect the presence or absence of a UE allocation in the RBs on the assigned port.

In one example, the network entity may signal information related to the resource allocation information of a co-scheduled UE. In DCI Format 2C, the 3GPP Specification 36.212 describes the signaling of resource allocation to a UE. A resource allocation header (resource allocation type 0/type 1)—1 bit as defined in section 7.1.6 (of 36.213). If downlink bandwidth is less than or equal to 10 PRBs, there is no resource allocation header, and resource allocation type 0 is assumed. Resource block assignment: for resource allocation type 0 as defined in section 7.1.6.1 of [36.213] and $\lceil N_{RB}^{DL}/P \rceil$ bits provide the resource allocation; for resource allocation type 1 as defined in section 7.1.6.2 (of 36.213) $\lceil \log_2(P) \rceil$ bits of this field are used as a header specific to this resource allocation type to indicate the selected resource blocks subset, 1 bit indicates a shift of the resource allocation span, and $(\lceil N_{RB}^{DL}/P \rceil - \lceil \log_2(P) \rceil - 1)$ bits provide the resource allocation, where the value of P depends on the number of DL resource blocks as indicated in section 7.1.6.1 (of 36.213).

The resource allocation defined includes a bitmap or a selection from a set of localized or distributed resource blocks and virtual resource blocks or resource block groups. This resource allocation allows sufficient flexibility to share the resources in frequency to different UEs. Further, a resource allocation header indicates a selection between the resource allocation types.

To enable support for interference cancellation, some further coordination of resource allocation may be useful. In various embodiments, a co-channel resource allocation block assignment field and co-channel resource allocation header may be defined to indicate the resource allocation information of a co-scheduled UE. In these embodiments, the UE may assume the interference from that UE only in the set of overlapping resources. For example, as illustrated in FIG. 8, the UE assumes interference from only the co-scheduled/overlapping blocks and no interference is assumed in the non-overlapping blocks.

In another example, the set of overlapping resources over which an interfering UE is scheduled may be directly indicated with a resource allocation header and a resource block assignment field. In another example, the set of overlapping resources over which an interfering UE is not scheduled may be directly indicated with a resource allocation header and a resource block assignment field. In another example, a set of resource assignments may be pre-defined (e.g., by higher layer signaling or fixed) and dynamic signaling may be used to select between the different resource assignments to reduce overhead in DCI. In another example, co-channel resource allocation may be implicitly determined by the UE using one or more of the other parameters signaled for the other UE, (e.g., port index, port RNTI, a pre-configured group ID for similarly scheduled UEs). In these examples, the indicated resource allocation corresponds to the resources over which the UE can expect interference and the associated signaled interference reduction parameters (e.g., MCS, port RNTI, port ID, etc.) are applicable.

In various embodiments, the base station may transmit the PDSCH using DM-RS ports that are scrambled with the port's scrambling ID instead of the C-RNTI of the UE, and the network entity assigns each DM-RS port a different port scrambling ID. In one example, the scrambling initialization equation may be calculated according to equation 3 below:

$$c_{init} = n_{Port\text{-}ID} \cdot 2^{14} + q \cdot 2^{13} + \lfloor n_s/2 \rfloor \cdot 2^9 + N_{ID}^{cell} \quad \text{(Equation 3)}$$

where $n_{Port-ID}$ is the DM-RS port scrambling ID. The UE can be configured or controlled by the network entity to perform PDSCH descrambling using the legacy method or the descrambling method described above. This configuration/control can be semi-static (i.e. signaled by a higher layer), for example, via transmission mode configuration. Table 8 provides one example of an illustration of a higher layer configuration of the PDSCH scrambling method.

TABLE 8

| Higher layer signaling | PDSCH scrambling method |
| --- | --- |
| 0 | Legacy scrambling method |
| 1 | Scrambled with the port scrambling ID |

In other embodiments, the configuration or control can also be dynamic. For example, the UE may switch between the legacy method and the method of descrambling using the port scrambling ID, depending on the control information received from PDCCH or ePDCCH. In One example, the dynamic control may be indicated using 1-bit signaling in the DCI format (for DL assignment). For example, a "0" indicates the legacy method should be used to receive the corresponding PDSCH, and a "1" indicates that method of descrambling using the port scrambling ID should be used to receive the corresponding PDSCH. In another example, the DM-RS ports assigned or the rank assigned. For example, if the DM-RS port(s) assigned are 7, 7 and 8, 9, 9 and 10, or, more generally, if the rank assigned is less than or equal to some specified number x where x can e.g. be 2, the port scrambling ID method is used (i.e., MU-MIMO operation may be assumed). Otherwise, the UE assumes that the legacy method is used (i.e., SU-MIMO operation may be assumed).

In another example, the type of DCI format may be used to indicate the PDSCH scrambling method. For example, if DCI format 1A is received, the legacy method is assumed to be used to descramble the corresponding PDSCH, else if DCI format 2C (or reference DCI format) is received, the port scrambling ID method is used to descramble the corresponding PDSCH. In another example, further dependency on where the DCI format was received may be used to indicate the PDSCH scrambling method. For example, if the DCI format 1A was received in the common search space of the PDCCH/ePDCCH region, then the legacy method is used to descramble the corresponding PDSCH, else if the DCI format 1A was received in the UE-specific search space of the PDCCH/ePDCCH region, then the port scrambling ID method is used to descramble the corresponding PDSCH. The dynamic control methods above assume the UE is already configured beforehand (higher-layer e.g. RRC) to apply the dynamic control methods.

One benefit of scrambling PDSCH with port scrambling ID instead of the C-RNTI may include facilitation of MU-interference cancellation and/or suppression for PDSCH. For example, given that the UE knows the port scrambling ID of the UE, as well as the port scrambling ID of the interfering UE, the port scrambling ID method allows the UE to descramble and then decode the interfering PDSCH, which can then be used for interference cancellation/suppression as discussed above, for example, with regard to the feedback loop 730 in FIG. 7.

In various embodiments, the signaling of the port scrambling ID signaling may include a predefined port scrambling ID for each DM-RS port. Table 9 illustrates one example of a mapping for 8 ports. However, mapping for fewer numbers of DM-RS ports is also possible (e.g. just ports 7, 8, 9, and 10).

TABLE 9

| DM-RS port index | Port scrambling ID |
| --- | --- |
| 7 | 000 |
| 8 | 001 |
| 9 | 010 |
| 10 | 011 |
| 11 | 100 |
| 12 | 101 |
| 13 | 110 |
| 14 | 111 |

In this example, if the UE is signaled or detects blindly the interfering UE's port(s), the UE is able to derive the port scrambling ID used for the PDSCH of the interfering UE.

In another example, a higher layer configuration of port scrambling ID for each DM-RS port (e.g. via an RRC) may be used to indicated the port scrambling ID to the UE. Table 10 illustrates one example of a mapping for 8 ports. However, mapping for fewer numbers of DM-RS ports is also possible (e.g. just ports 7, 8, 9, and 10). For example, the number of bits for the ID value can be $\log_2$ (number of DM-RS ports) (i.e., 3 for 8 ports and 2 for 4 ports) or the number of bits may be of the same length as the C-RNTI (i.e., 16 bits).

TABLE 10

| DM-RS port index | Port scrambling ID |
| --- | --- |
| 7 | A |
| 8 | B |
| 9 | C |
| 10 | D |
| 11 | E |
| 12 | F |
| 13 | G |
| 14 | H |

In this example, if the UE is signaled or detects blindly the interfering UE's port(s), the UE is able to derive the port scrambling ID used for the PDSCH of the interfering UE. In some embodiments, the higher layering signaling of Table 10 is common for all MU UEs may be broadcasted. In other embodiments (e.g., if the configuration and the configured value are UE-specific), the UE should also be signaled the port-scrambling ID of the interfering UE or the UE should blindly detect the port scrambling ID of the interfering UE. Signaling of the DM-RS port scrambling ID of the interfering UE has significantly lower overhead than signaling of C-RNTI. For example, if 8 ports are defined, only 3 bits are required for signaling of the DM-RS port scrambling ID, compared to 16 bits for C-RNTI signaling.

Figure 9:
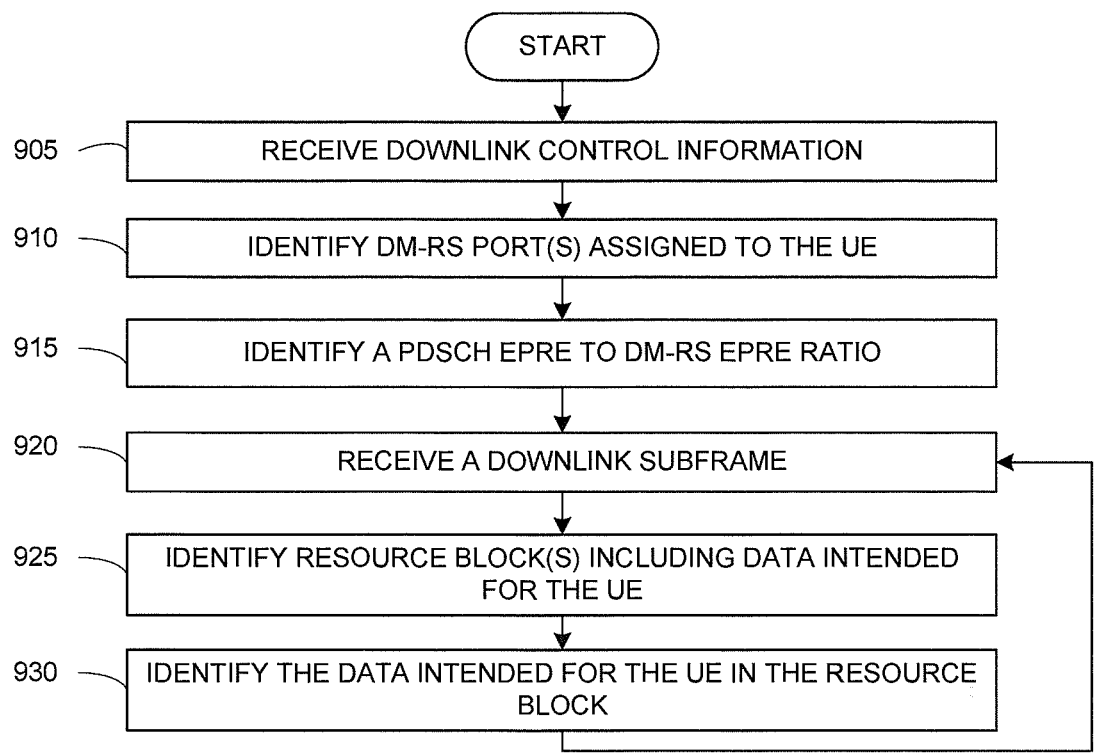
FIG. 9 illustrates a process for identifying resource scheduling for a UE in a multiple-user multiple-input multiple-output wireless communication system in accordance with various embodiments of the present disclosure.

FIG. 9 illustrates a process for identifying resource scheduling for a UE in a multiple-user multiple-input multiple-output wireless communication system in accordance with various embodiments of the present disclosure. For example, the process depicted in FIG. 9 may be performed by the receiver 310 in FIG. 3. The process may also be implemented by the UE 700 in FIG. 7.

The process begins by the UE receiving downlink control information (step 905). For example, in step 905, the UE may receive downlink control information in control signaling in a DCI format. The downlink control information may be statically or semi-statically signaled. Alternatively, the downlink control information may be dynamically signaled, for example, in each downlink subframe. The UE then identifies DM-RS port(s) assigned to the UE (step 910). For example, in step 910, the UE may identify the DM-RS port(s) for the UE in the downlink control information.

The UE then identifies a PDSCH EPRE to DM-RS EPRE ratio (step 915). For example, in step 915, the UE may identify the PDSCH EPRE to DM-RS EPRE ratio and whether rate matching is used from a jointly encoded signal bit field in the downlink control information. For example, the UE may identify the PDSCH EPRE to DM-RS EPRE ratio as 0 dB or −3 dB. The UE may also identify a number layers, a scrambling identifier, and whether rate matching is used from a jointly encoded message in the downlink control information. The UE may also identify information about one or more interfering UEs including at least one of a modulation and coding scheme of the one or more interfering UEs, one or more port(s) assigned to the one or more interfering UEs, a number of the one or more interfering UEs, a UE identifier for the one or more interfering UEs, or a DM-RS port scrambling identifier for the one or more interfering UEs. The UE may also identify a DM-RS port scrambling identifier for a DM-RS port assigned to an interfering UE to use to calculate an initialization value for a scrambling sequence for resources assigned to the interfering UE and reduce interference. The UE may also identify whether an interfering UE is allocated a group of resource blocks that overlaps with resource blocks assigned to the UE to reduce interference.

The UE then receives a downlink subframe (step 920). The UE then identifies resource block(s) including data intended for the UE (step 925). The UE then identifies the data intended for the UE in the resource block (step 930). For example, in step 930, the UE may identify the data using the one or more DM-RS port(s) and the PDSCH EPRE to DM-RS EPRE ratio. The resource block in the downlink subframe may include data for multiple users in the wireless communication system. Thereafter, the UE returns to step 920 to receive and decode data from additional downlink subframes.

Figure 10:
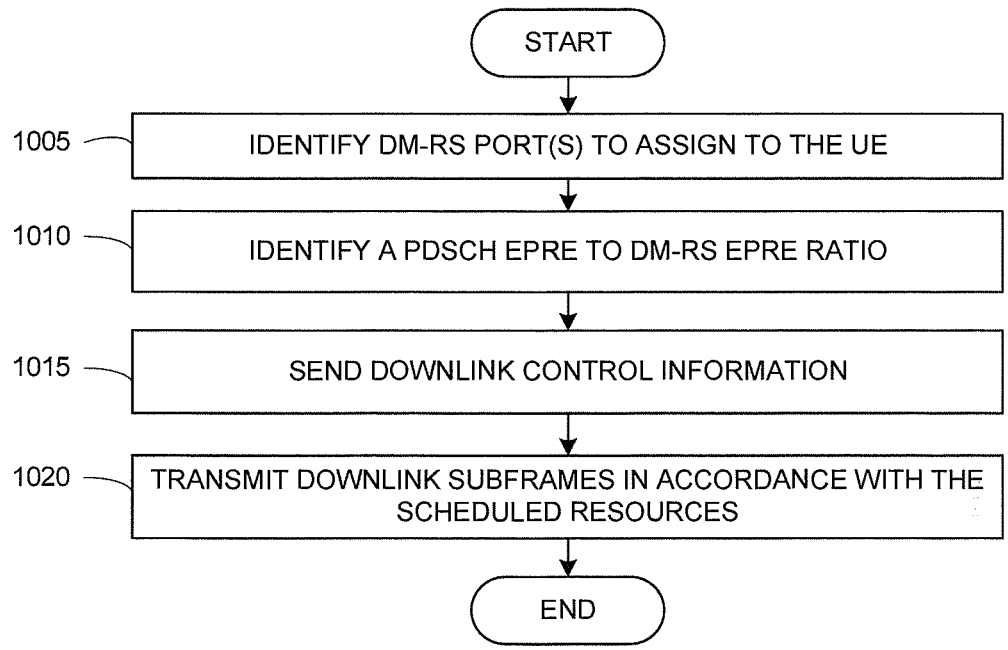
FIG. 10 illustrates a process for scheduling resources in a multiple-user multiple-input multiple-output wireless communication system in accordance with various embodiments of the present disclosure.

FIG. 10 illustrates a process for scheduling resources in a multiple-user multiple-input multiple-output wireless communication system in accordance with various embodiments of the present disclosure. For example, the process depicted in FIG. 10 may be performed by the transmitter 305 in FIG. 3. The process may also be implemented by a network entity, such as an eNB, RRH, relay station, underlay base station, GW, or BSC.

The process begins by the network entity identifying DM-RS port(s) to assign to the UE (step 1005). The network entity then identifies a PDSCH EPRE to DM-RS EPRE ratio (step 1010). For example, in step 1010, the network entity may use the PDSCH EPRE to DM-RS EPRE ratio to multiplex data in a same frequency resource.

The network entity then sends downlink control information (step 1015). For example, in step 1015, the network entity may send the control information to the UE to indicate the DM-RS port(s) and PDSCH EPRE to DM-RS EPRE ratio. The downlink control information may be statically or semi-statically signaled. Alternatively, the downlink control information may be dynamically signaled, for example, in each downlink subframe. In one example, the PDSCH EPRE to DM-RS EPRE ratio and whether rate matching is used may be jointly encoded into a signal bit field in the downlink control information. The one or more DM-RS port(s) assigned to the UE, a number layers, a scrambling identifier, the PDSCH EPRE to DM-RS EPRE ratio, and whether rate matching is used may be jointly encoded in the downlink control information. The downlink control information may include an indication of information about one or more interfering UEs including at least one of a modulation and coding scheme of the one or more interfering UEs, one or more port(s) assigned to the one or more interfering UEs, a number of the one or more interfering UEs, a UE identifier for the one or more interfering UEs, or a DM-RS port scrambling identifier for the one or more interfering UEs. The downlink control information may include an indication of a DM-RS port scrambling identifier for a DM-RS port assigned to an interfering UE. The downlink control information may include an indication of an initialization value for a scrambling sequence for resources assigned to the interfering UE using the DM-RS port scrambling identifier. The downlink control information may include an indication of whether an interfering UE is allocated a group of resource blocks that overlaps with resource blocks assigned to the UE.

The network entity then transmits downlink subframes in accordance with the scheduled resources (step 1020). For example, in step 1020, the network entity may transmit the downlink subframes according to the one or more DM-RS port(s) assigned to the UE and the PDSCH EPRE to DM-RS EPRE ratio.

Although FIGS. 9 and 10 illustrate examples of processes for scheduling resources and identifying resource scheduling in a MU-MIMO wireless communication system, respectively, various changes could be made to FIGS. 9 and 10. For example, while shown as a series of steps, various steps in each figure could overlap, occur in parallel, occur in a different order, or occur multiple times.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for identifying resource scheduling for a user equipment (UE) in a multiple-user multiple-input multiple-output wireless communication system, the method comprising:
receiving downlink control information;
identifying, from the downlink control information, one or more demodulation reference signal (DM-RS) ports assigned to the UE and a physical downlink shared channel (PDSCH) energy per resource element (EPRE) to DM-RS EPRE ratio; and
identifying a signal including data intended for the UE in a resource block in a downlink subframe from another signal in the resource block including data intended for another UE using the one or more DM-RS ports and the PDSCH EPRE to DM-RS EPRE ratio, wherein the resource block in the downlink subframe includes data for multiple users in the wireless communication system.

2. The method of claim 1 further comprising identifying the PDSCH EPRE to DM-RS EPRE ratio and whether rate matching is used from a jointly encoded signal bit field in the downlink control information.

3. The method of claim 1, wherein identifying the one or more DM-RS ports assigned to the UE and the PDSCH EPRE to DM-RS EPRE ratio comprises identifying the one or more DM-RS ports assigned to the UE, a number layers, a scrambling identifier, the PDSCH EPRE to DM-RS EPRE ratio, and whether rate matching is used from a jointly encoded message in the downlink control information.

4. The method of claim 1 further comprising:
identifying, from the downlink control information, information about one or more interfering UEs including at least one of a modulation and coding scheme of the one or more interfering UEs, one or more ports assigned to the one or more interfering UEs, a number of the one or more interfering UEs, a UE identifier for the one or more interfering UEs, or a DM-RS port scrambling identifier for the one or more interfering UEs; and reducing interference from at least one of the one or more interfering UEs in identifying the data intended for the UE in the resource block using the information about one or more interfering UEs.

5. The method of claim 1 further comprising:
identifying, from the downlink control information, a DM-RS port scrambling identifier for a DM-RS port assigned to an interfering UE;
identify an initialization value for a scrambling sequence for resources assigned to the interfering UE using the DM-RS port scrambling identifier; and
reducing interference from the interfering UE in identifying the data intended for the UE in the resource block using the initialization value for the scrambling sequence for resources assigned to the interfering UE.

6. The method of claim 1 further comprising:
identifying, from the downlink control information, whether an interfering UE is allocated a group of resource blocks that overlaps with resource blocks assigned to the UE; and
reducing interference from the interfering UE in the group of resource blocks that overlaps with resource blocks assigned to the UE in identifying the data intended for the UE.

7. A method for scheduling resources in a multiple-user multiple-input multiple-output wireless communication system, the method comprising:
identifying one or more demodulation reference signal (DM-RS) ports to assign to a UE and a physical downlink shared channel (PDSCH) energy per resource element (EPRE) to DM-RS EPRE ratio for identifying a signal including data intended for the UE in a resource block in a downlink subframe from another signal in the resource block including data intended for another UE; and
including an indication of the one or more DM-RS ports and the PDSCH EPRE to DM-RS EPRE ratio in downlink control information,
wherein the resource block in the downlink subframe includes data for multiple users in the wireless communication system.

8. The method of claim 7, wherein including the indication of the one or more DM-RS ports and the PDSCH EPRE to DM-RS EPRE ratio in the downlink control information comprises jointly encoding an indication of the one or more DM-RS ports assigned to the UE, a number layers, a scrambling identifier, the PDSCH EPRE to DM-RS EPRE ratio, and whether rate matching is used from in the downlink control information.

9. The method of claim 7 further comprising including, in the downlink control information, information about one or more interfering UEs including at least one of a modulation and coding scheme of the one or more interfering UEs, one or more ports assigned to the one or more interfering UEs, a number of the one or more interfering UEs, a UE identifier for the one or more interfering UEs, or a DM-RS port scrambling identifier for the one or more interfering UEs for reducing interference from at least one of the one or more interfering UEs.

10. The method of claim 7 further comprising including, in the downlink control information, whether an interfering UE is allocated a group of resource blocks that overlaps with resource blocks assigned to the UE for reducing interference from the interfering UE in the group of resource blocks that overlaps with resource blocks assigned to the UE.

11. An apparatus configured to identify resource scheduling for a user equipment (UE) in a multiple-user multiple-input multiple-output wireless communication system, the apparatus comprising:
a receiver configured to receive downlink control information; and
a controller configured to:
identify, from the downlink control information, one or more demodulation reference signal (DM-RS) ports assigned to the UE and a physical downlink shared channel (PDSCH) energy per resource element (EPRE) to DM-RS EPRE ratio, and
identify a signal including data intended for the UE in a resource block in a downlink subframe from another signal in the resource block including data intended for another UE using the one or more DM-RS ports and the PDSCH EPRE to DM-RS EPRE ratio,
wherein the resource block in the downlink subframe includes data for multiple users in the wireless communication system.

12. The apparatus of claim 11, wherein the controller is configured to identify the PDSCH EPRE to DM-RS EPRE ratio and whether rate matching is used from a jointly encoded signal bit field in the downlink control information.

13. The apparatus of claim 11, wherein in identifying the one or more DM-RS ports assigned to the UE and the PDSCH EPRE to DM-RS EPRE ratio, the controller is configured to identify the one or more DM-RS ports assigned to the UE, a number layers, a scrambling identifier, the PDSCH EPRE to DM-RS EPRE ratio, and whether rate matching is used from a jointly encoded message in the downlink control information.

14. The apparatus of claim 11, wherein the controller is configured to:
identify, from the downlink control information, information about one or more interfering UEs including at least one of a modulation and coding scheme of the one or more interfering UEs, one or more ports assigned to the one or more interfering UEs, a number of the one or more interfering UEs, a UE identifier for the one or more interfering UEs, or a DM-RS port scrambling identifier for the one or more interfering UEs; and
control receiver processing circuitry to reduce interference from at least one of the one or more interfering UEs in identifying the data intended for the UE in the resource block using the information about one or more interfering UEs.

15. The apparatus of claim 11, wherein the controller is configured to:
identify, from the downlink control information, a DM-RS port scrambling identifier for a DM-RS port assigned to an interfering UE;
identify an initialization value for a scrambling sequence for resources assigned to the interfering UE using the DM-RS port scrambling identifier; and
control receiver processing circuitry to reduce interference from the interfering UE in identifying the data intended for the UE in the resource block using the initialization value for the scrambling sequence for resources assigned to the interfering UE.

16. The apparatus of claim 11, wherein the controller is configured to:

identify, from the downlink control information, whether an interfering UE is allocated a group of resource blocks that overlaps with resource blocks assigned to the UE; and control receiver processing circuitry to reduce interference from the interfering UE in the group of resource blocks that overlaps with resource blocks assigned to the UE in identifying the data intended for the UE.

17. An apparatus configured to schedule resources in a multiple-user multiple-input multiple-output wireless communication system, the apparatus comprising:

a transmitter; and a controller configured to:

identify one or more demodulation reference signal (DM-RS) ports to assign to a UE and a physical downlink shared channel (PDSCH) energy per resource element (EPRE) to DM-RS EPRE ratio for identifying a signal including data intended for the UE in a resource block in a downlink subframe from another signal in the resource block including data intended for another UE, and control the transmitter to include an indication of the one or more DM-RS ports and the PDSCH EPRE to DM-RS EPRE ratio in downlink control information, wherein the resource block in the downlink subframe includes data for multiple users in the wireless communication system.

18. The apparatus of claim 17, wherein in controlling the transmitter to include the indication of the one or more DM-RS ports and the PDSCH EPRE to DM-RS EPRE ratio in the downlink control information, the controller is configured to control the transmitter to jointly encode an indication of the one or more DM-RS ports assigned to the UE, a number layers, a scrambling identifier, the PDSCH EPRE to DM-RS EPRE ratio, and whether rate matching is used from in the downlink control information.

19. The apparatus of claim 17, wherein the controller is configured to control the transmitter to include, in the downlink control information, information about one or more interfering UEs including at least one of a modulation and coding scheme of the one or more interfering UEs, one or more ports assigned to the one or more interfering UEs, a number of the one or more interfering UEs, a UE identifier for the one or more interfering UEs, or a DM-RS port scrambling identifier for the one or more interfering UEs for reducing interference from at least one of the one or more interfering UEs.

20. The apparatus of claim 17, wherein the controller is configured to control the transmitter to include, in the downlink control information, whether an interfering UE is allocated a group of resource blocks that overlaps with resource blocks assigned to the UE for reducing interference from the interfering UE in the group of resource blocks that overlaps with resource blocks assigned to the UE.

* * * * *